United States Patent

Lee

[11] 4,421,905
[45] Dec. 20, 1983

[54] PROCESS FOR PREPARING POLYIMIDES END-CAPPED WITH ANHYDRIDE OR ISOCYANATE GROUPS

[75] Inventor: Chung J. Lee, Sheboygan, Wis.

[73] Assignee: Plastics Engineering Company, Sheboygan, Wis.

[21] Appl. No.: 420,567

[22] Filed: Sep. 20, 1982

[51] Int. Cl.³ .............................................. C08G 73/10
[52] U.S. Cl. ........................................ 528/56; 528/52; 528/53; 528/54; 528/55; 528/73; 528/84
[58] Field of Search ....................... 528/55, 56, 73, 84, 528/53, 54, 52

[56] References Cited

U.S. PATENT DOCUMENTS 3,682,860  8/1972  Yoda et al. ............................. 528/56
3,997,513  12/1976  Noda et al. ............................ 528/84
4,094,864  6/1978  Onder .................................... 528/56

Primary Examiner—Lester L. Lee
Attorney, Agent, or Firm—Walter J. Monacelli

[57] ABSTRACT

The process described herein comprises the preparation of polyimides by the reaction of aromatic dianhydrides and aromatic diisocyanates in the presence of a metal acetylacetonate, such as Al, Co, Fe, Ni, Zr, etc. By using appropriate proportions, the polyimides may be end-capped with either anhydride or isocyanate groups. The use of the acetylacetonate permits the use of lower temperatures for imide ring closure thereby avoiding undesirable coreaction between anhydride groups and certain solvents. "Polyimide dianhydride" is an anhydride-terminated polyimide; and "polyimide diisocyanate" is an isocyanate-terminated polyimide as represented by the respective formulas:

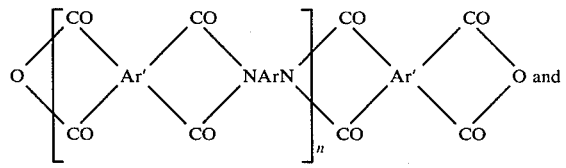

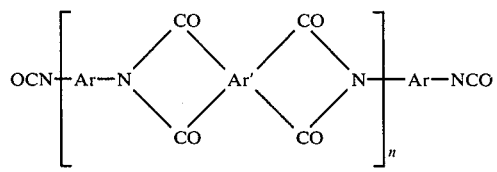

wherein Ar', Ar and n are as defined hereinafter. By this process, the polyimide dianhydride product has an anhydride activity of at least 0.17 as defined herein regardless of the type of solvent used.

13 Claims, No Drawings

PROCESS FOR PREPARING POLYIMIDES END-CAPPED WITH ANHYDRIDE OR ISOCYANATE GROUPS

BACKGROUND OF THE INVENTION

1. Field of the Invention

This invention relates to the preparation of polyimides end-capped with anhydride or other groups. More specifically it relates to a process for the preparation of such polyimides by the reaction of aromatic dianhydrides with aromatic diisocyanates. Still more specifically it relates to such reaction conducted in the presence of a metal acetylacetonate such as aluminum acetylacetonate. Still more specifically this process allows the use of lower temperatures and avoids certain destructive effects such as the reduction of the anhydride activity and thereby makes them more effective in a reaction with epoxy compounds.

2. State of the Prior Art

It has been found that when a polyimide having terminal anhydride groups is prepared by the reaction of an aromatic dianhydride with an aromatic diamine with sufficient excess dianhydride to give terminal anhydride groups in the presence of an amide solvent such as dimethylformamide (DMF), dimethylacetamide (DMA), N-methyl-2-pyrrolidone (NMP), etc., the anhydride activity is reduced, apparently by reaction between the anhydride and the amide groups in the solvent. It is believed that this undesirable side reaction is favored by the high temperatures required to complete cyclization or imidization for formation of the polyimide structure.

In the use of polyimide dianhydride-polyepoxide reaction products for use in laminations, coatings, etc. it is desirable to prepare such reaction products dissolved in concentrations of 20% by weight or more. U.S. Pat. No. 3,663,651 describes the reaction of polyepoxide with various polyimide dianhydrides. Throughout the teaching and working examples of this patent, there is no teaching of a process for forming a soluble reaction polyimide product in the proclaimed solvent systems, such as dimethylformamide (DMF) or N-methyl-2-pyrrolidone (NMP) nor of an anhydride activity above 0.17. Furthermore, it has been found that when any polyimide dianhydride is prepared using DMF as solvent, there is no detectable anhydride absorption peak (1840 cm$^{-1}$) in the product's infrared spectrum whereas an identical preparation in phenol or m-cresol gives a product with a substantial absorption at 1840 cm$^{-1}$. However separation of the phenol or cresol involves prolonged and expensive separation to recover the polyimide product so that it may be used in a solvent more suitable for lamination.

The reason for this failure to produce polyimide dianhydrides with high anhydride reactivity ($I_R$) when these amide solvents are used is not known, but it is suspected that there is a reaction occurring between the anhydride groups and these solvents during imidization at high temperatures. As has been found, a complete imidization in these solvents usually requires temperatures above 160° C. (but preferably below 170° C.) for several hours. It is quite possible that the DMF, as well as related solvents containing N-alkylated amide groups, react with the anhydride groups. This results in intermediates which have low anhydride activity, defined herein as $I_R$. However, whatever the reason, it has been found impossible to prepare well reacted polyimide-epoxy thermoset resins from a polyimide dianhydride which is prepared in DMF or a related solvent under known processes.

A problem encountered when an anhydride-terminated polyamic acid is used for preparing the polyimide-epoxy thermoset laminate is that delamination occurs when the molding or post-curing temperature is above 180° C. However, since the use of high molding temperatures of this kind (above 180° C.) is required to insure complete cyclization of imide groups and a complete curing of polyimide-epoxy thermoset resin, laminates produced from the polyamic type are unsatisfactory.

It is important therefore, that the method, including the solvent, used for preparing the polyimide dianhydride, is one that produces these intermediates with a high anhydride activity ($I_R$) and good conversion to imide structures. The high $I_R$, good solubility and low fusion temperatures are desirable for good subsequent reaction with a polyepoxide.

In this field of polyimides there are a number of terms which are commonly used, such as "degree of polymerization" (DP), "molar ratio of monomers" ($r_m$), "statistical average of structure reoccurrence" (n), "degree of imidization" (C), "relative reactivity" ($I_R$), and the "ratio of epoxy equivalents to anhydride equivalents." These are defined as follows:

The Molar Ratio of starting monomers is represented as $r_m$ or X/Y, with X representing moles of diamine and Y the moles of dianhydride.

Degree of Polymerization (DP)—Polyimides may be prepared by reacting X moles of diamine with Y moles of dianhydride. To produce an anhydride-terminated polyimide, Y is greater than X. The statistical average "degree of polymerization" (DP) may be calculated on the basis that the formation of the intermediate amic acid groups may be negated by the relatively long reaction periods used as compared to the relatively short time for amic acid formation. Therefore:

$$DP = (1 + r_m)/(1 - r_m)$$

Statistical Average of Structure Reoccurrence (n) is equal to:

$$(DP - 1)/2 = r_m/(1 - r_m)$$

For example, where $r_m$ is 0.5 and DP is 3, then n is 1.

Degree of Imidization (C) is equal to the amount of water distilled from the reaction divided by the amount of water theoretically to be removed by complete imidization. This is equal to $(2n \times 18)$ grams for making one gram mole of polyimide.

Relative Reactivity ($I_R$) is the ratio of the intensity peak ratio of the absorption peak of the anhydride group at 1840 cm$^{-1}$ to that of the imide group at 1790 cm in the Infrared Spectrum of the polyimide.

Equivalents Ratio of epoxy to anhydride (R) is:
R = (No. of equivalent weights of polyepoxide)/(No. of equivalent weights of dianhydride)
wherein the number of equivalent weights of a component is the weight of the component divided by the equivalent weight of the component.

STATEMENT OF THE INVENTION

In accordance with the present invention it has been found that polyimides may be prepared by the reaction of aromatic dianhydrides with aromatic diisocyanates in the presence of metal acetylacetonates, such as Al, Co, Ni, Fe and Zr, which compounds apparently allow the imidization or cyclization to be completed at lower temperatures so that anhydride activity will not be destroyed or reduced by reaction with amide groups that may be present in the solvent. By using an excess of the aromatic dianhydride, the resulting polyimide may be end-capped with anhydride groups. If polyimides end-capped with amine groups are desired, the anhydride end-capped polyimide may be reacted with one mole of an aromatic diamine per terminal anhydride group to convert the "polyimide dianhydride" to the corresponding "polyimide diamine." By using an excess of the aromatic diisocyanate in preparing the polyimide, the product will be a "polyimide diisocyanate."

The "polyimide dianhydrides" are represented by the formula:

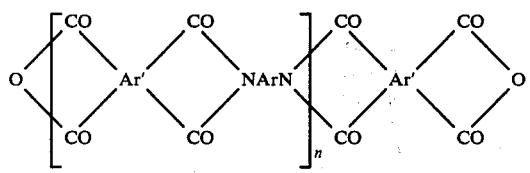

and the "polyimide diisocyanates" represented by the formula:

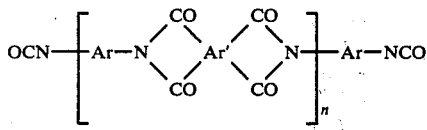

in which formulas Ar' is a tetravalent aromatic organic radical, the four carbonyl groups being attached directly to separate carbon atoms and each pair of carbonyl groups being attached to adjacent carbon atoms in the Ar' radical except that in the case of the Ar' being a naphthalene radical, one or both pairs of the carbonyl groups may be attached to peri carbon atoms; Ar is a divalent aromatic radical; and n is an integer of at least one, preferably 1–20. It has been found that the polyimide dianhydride should have a high anhydride activity ($I_R$), namely at least 0.17 as measured by its infrared spectrum.

When n+1 moles of an aromatic dianhydride are reacted with n moles of an aromatic diisocyanate in the presence of the metal acetylacetonate, the following reaction occurs with the elimination of carbon dioxide:

(n + 1) O(OC)$_2$Ar'(CO)$_2$O + n OCNArNCO $\xrightarrow{\text{MeAcetylacetonate}}$ Reaction I O[(OC)$_2$Ar'(CO)$_2$N—Ar—N]$_n$(CO)$_2$Ar'(CO)$_2$O + n CO$_2$ As stated above, the presence of the acetylacetonate promotes the cyclization or formation of the imide group >(CO)$_2$N— at lower temperatures than otherwise possible and thereby avoids the side reaction which occurs between the anhydride and any N-containing groups such as amide groups that might be present in solvents such as dimethylacetamide (DMA), dimethylformamide (DMF), N-methyl-pyrrolidone (NMP), etc. By avoiding such side reactions it is now possible to prepare polyimide dianhydrides in the presence of N-containing groups such as DMA, DMF, NMP, etc. which have the terminal anhydride groups intact so that the anhydride activity ($I_R$) is at least 0.17 and preferably higher.

By reversing the ratio of diisocyanate to dianhydride, the same reaction may be used to give polyimide diisocyanates as follows:

n O(OC)$_2$Ar'(CO)$_2$ + (n + 1) OCNArNCO $\xrightarrow{\text{MeAcetylacetonate}}$ Reaction II OCN—[Ar—N(CO)$_2$Ar'(CO)$_2$N]$_n$—Ar—NCO + n CO$_2$ Polyimides produced by the process of this invention may be represented generically by the formula:

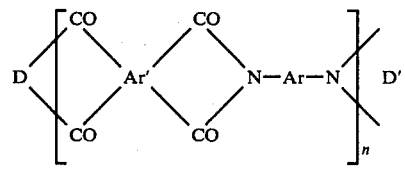

wherein Ar' and Ar are as defined above, and
D is O< or OCN—Ar—N<; and D' is

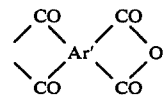

or >CO.
When one D represents O<, and D' represents

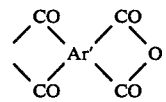

a polyimide dianhydride is represented. When D represents >N—Ar—NCO, and D' represents OC< a polyimide diisocyanate is represented. Other combinations of the D and D' groups will represent a polyimide having one terminal isocyanate group and one anhydride group.

By having the terminal anhydride groups intact, that is with the $I_R$ at least 0.17 and preferably even higher, polyimide dianhydrides may be more satisfactorily reacted with polyepoxide compounds, particularly with regard to the improved production of laminated products and coating compositions.

In preparing the anhydride-terminated and isocyanate-terminated polyimides in accordance with the practice of this invention, any of the aromatic tetracarboxylic acid dianhydrides known in the prior art can be used. Among the useful dianhydrides are 3,3',4,4'-benzophenonetetracarboxylic acid dianhydride, pyromellitic dianhydride, 2,3,6,7-naphthalene tetracarboxylic acid dianhydride, 1,4,5,6-naphthalene-tetracarboxylic dianhydride, 3,3'4,4'-diphenyl tetracarboxylic acid dianhydride, 1,2,5,6-naphthalene tetracarboxylic acid dianhydride, 2,2'3,3'-diphenyl tetracarboxylic acid dianhydride, 2,2-bis(3,4-dicarboxyphenyl) propane dianhydride, 3,4,9,10-perylene tetracarboxylic acid dianhydride, bis(3,4-dicarboxyphenyl) ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl) propane dianhydride, 1,1-bis(2,3-dicarboxyphenyl) ethane dianhydride, 1,1bis(3,4-dicarboxyphenyl) ethane dianhydride, bis(2,3-dicarboxyphenyl) methane dianhydride, bis(3,4dicarboxyphenyl) methane dianhydride, bis(3,4-dicarboxyphenyl sulfone dianhydride, and benzene-1,2,3,4-tetracarboxylic acid dianhydride. The first three mentioned dianhydrides are preferred.

Diisocyanates useful in preparing the starting polyimides have the formula:

OCN—Ar—NCO wherein Ar is a divalent aromatic organic radical. Preferred aromatic diisocyanates are those wherein Ar is a divalent benzenoid radical selected from the group consisting of:

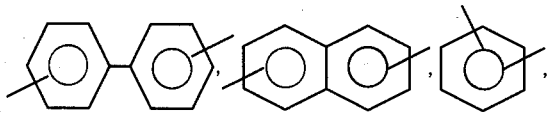

and multiples thereof connected to each other by R''', e.g.:

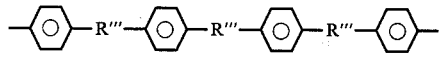

wherein R''' is —CH=CH—,

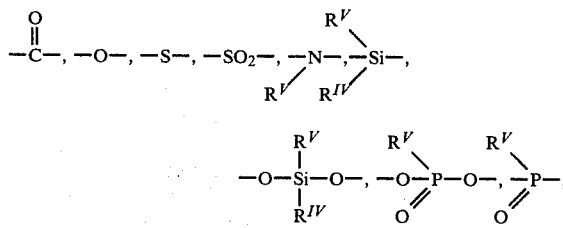

or an alkylene chain of 1–3 carbon atoms, wherein $R^V$ and $R^{IV}$ are each selected from the group consisting of alkyl and aryl radicals containing one to six carbon atoms, e.g., methyl, ethyl, hexyl, n-butyl, i-butyl and phenyl.

Examples of the aromatic diisocyanates which are suitable for use in the present invention are 1,4-phenylenediisocyanate, 1,3-phenylenediisocyanate, 2,4-tolylenediisocyanate, 2,5-tolylenediisocyanate, 2,6-tolyenediisocyanate, 3,5-tolyenediisocyanate, 4-chloro-1,3phenylenediisocyanate, 1-methoxy-2,4-phenylenediisocyanate, 1-methyl-3,5-diethyl-2,6-phenylenediisocyanate, 4,4'-diisocyanato-diphenyl propane, 4,4'-diisocyanato-diphenyl methane, 4,4'-diisocyanato-diphenyl sulfide, 3,3'-diisocyanato-diphenyl sulfone, 4,4'-diisocyanato-diphenyl sulfone, 4,4'-diisocyanato-diphenyl diphenyl-silane, 4,4'-diisocyanato-diphenyl ethyl phosphine oxide, 4,4'-diisocyanato-diphenyl phenyl phosphine oxide, 4,4'-diisocyanato-diphenyl N-methyl amine, 4,4'-diisocyanato-diphenyl N-phenyl amine and mixtures thereof; 3,3'-dimethyl-4,4'-diisocyanato-diphenylmethane, 3,3'-diethyl-4,4'-diisocyanato-diphenylmethane, 3,3'-dimethoxy-4,4'-diisocyanato-diphenylmethane, 3,3'-diethoxy-4,4'-diisocyanato-diphenylmethane, 3,3'-dichloro-4,4',4,4'-ddisocyanato-diphenylmethane, 3,3'-dibrome-4,4'-diisocyanato-diphenylmethane, 3,3'-dicarboxy-4,4'-diisocyanato-phenylmethane, 3,3'-dihydroxy-4,4'-diisocyanato-phenylmethane, 3,3'-disulpho-4,4'-diisocyanato-diphenylmethane, 3,3'-dimethyl-4,4-diisocyanato-diphenylether, 3,3'-diethyl-4,4'-diisocyanato-diphenylether, 3,3'-dimethoxy-4,4'-diisocyanato-diphenylether, 3,3'-diethoxy-4,4'-diisocyanato-diphenylether, 3,3'-dichloro-4,4'-diisocyanato-diphenylether, 3,3'-dibrome-4,4'-diisocyanato-diphenylether, 3,3'-dicarboxy-4,4'-diisocyanato-diphenylether, 3,3'-dihydroxy-4,4'-diisocyanato-diphenylether, 3,3'-disulfo-4,4'-diisocyanato-diphenylether, 3,3'-dimethyl4,4'-diisocyanato-diphenylsulfide, 3,3'-diethyl-4,4'-diisocyanato-diphenylsulfide, 3,3'-dimethoxy-4,4'-diisocyanato-diphenylsulfide, 3,3'-diethoxy-4,4'-diisocyanato-diphenylsulfide, 3,3'-dichloro-4,4'-diisocyanato-diphenylsulfide, 3,3'-dibromo-4,4'-diisocyanato-diphenylsulfide, 3,3'-dicarboxyl-4,4'-diisocyanato-diphenylsulfide, 3,3'-dihydroxy-4,4'-diisocyanato-diphenylsulfide, 3,3'-disulfo-4,4'-diisocyanato-diphenylsulfide, 3,3'-dimethyl-4,4'-diisocyanato-diphenylsulfone, 3,3'-diethoxy-4,4'-diisocyanato-diphenylsulfone, 3,3'-dichloro-4,4'-diisocyanato-diphenylsulfone, 3,3'-dicarboxy-4,4-diisocyanato-diphenylsulfone, 3,3'-dihydroxy-4,4'-diisocyanato-diphenylsulfone, 3,3'-disulfo-4,4'-diisocyanato-diphenylsulfone, 3,3'-diethyl-4,4'-diisocyanato-diphenylpropane, 3,3'-dimethoxy-4,4'-diisocyanato-diphenylpropane, 3,3'-dichloro-4,4'-diisocyanato-diphenylpropane, 3,3'-dicarboxy-4,4'-diisocyanato-diphenylpropane, 3,3'-dihydroxy-4,4'-diisocyanato-diphenylpropane, 3,3'-disulfo-4,4'-diisocyanato-diphenylpropane, 3,3'dimethyl-4,4'-diisocyanato-benzophenone, 3,3'-dimethoxy-4,4'-diisocyanato-benzophenone, 3,3'-dichloro-4,4'-diisocyanato-benzophenone, 3,3'-dibromo-4,4'-diisocyanato-benzophenone, 3,3'-dicarboxy-4,4'-diisocyanato-benzophenone, 3,3'-dihydroxy-4,4'-diisocyanato-benzophenone, 3,3'-disulphodiamino-benzophenone, 3,3'-diisocyanato-diphenylmethane, 3,3'-diisocyanato-diphenylether, 3,3'-diisocyanato-diphenylsulfide, 3,3'-diisocyanato-diphenylsulfone, 3,3'-diisocyanato-diphenylpropane, 3,3'-diisocyanato-benzophenone, 2,4-diisocyanato-toluene, 2,4-diisocyanato-toluene, 1-isopropyl-2,4-phenylenediisocyanate, 2,4-diisocyanato-anisole, 2,4-diisocyanato-monochlorobenzene, 2,4-diisocyanato-fluorobenzene, 2,4-diisocyanato-benzoic acid, 2,4-diisocyanato-phenol and 2,4-diisocyanato-benzenesulfonic acid and phenylene diamines. Preferred ddisocyanates are 4,4'-oxydiphenyl-diisocyanates, 4,4'-sulfonyldiisocyanates, 4,4'-methylene diphneyldiisocyanates, 4,4'-diisocyanato-benzophenone, 4,4'-diisocyanato-stilbene and the phenylene diisocyanates.

As explained above, the polyimide forming reactions are conducted in a nitrogen-containing solvent. The specific solvent will depend on the particular aromatic polyimide used. In most cases the solvent is an aprotic organic compound having a dielectric constant between 35 and 45, preferably one which is water soluble. Representative aprotic compounds are N-N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methlyl-alpha-pyrrolidone, tetramethylurea, hexamethylphosphoramide, N,N,N',N'-tetramethylethylmalonamide, N,N,N',N'-tetramethyl glutaramide, N,N,N',N'-tetramethylsuccinamide, thiobis(B,N-dimethylcarbamylmethyl) ether, N,N,N',N'-tetramethylfuraramide, methylsuccinonitrile, N,N-dimethylcyanocetamide, N,N-dimethyl-alpha-cyanopropionamide, N-formylpiperidine and butyrolacetone, etc. Preferred solvents are dimethylformamide, dimethylacetamide, N-methyl-alpha-pyrrolidone and caprolactam.

Metal Acetylacetonates are available from the Harshaw Chemical Company. These have the formula:

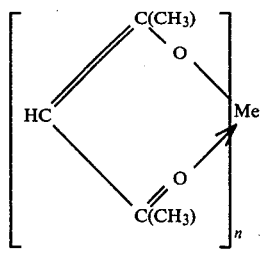

When the Me is Al, Co, Fe and Ni, "n" has a value of 3 and when Me is Zr, "n" has a value of 4.

The acetylacetonate-promoted reaction is advantageously conducted at a temperature in the range of 70°–150° C., preferably in the range of 100°–140° C. When the temperature is in the upper portion of these ranges, the imidization reaction is substantially completed in 2–4 hours.

The metal acetylacetonate is advantageously used in an amount of at least 0.005 gm, preferably at least 0.01 gm per equivalent weight of dianhydride and generally there is no need to exceed 1 gm of metal acetylacetonate to obtain the desired results. Advantageously the metal acetylacetonate is used in an amount of 0.005–1 gm of metal acetylacetonate, preferably 0.01–0.05 gm per gm of aromatic dianhydride.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight. In the preparation of the anhydride-terminated and amine-terminated polyimides, the continuous azeotropic technique described hereinabove is used.

In the following examples the purity or method of purification of various solvents is as follows:

The N-methyl-2-pyrrolidone (NMP) as sold by GAF Corporation, Chemical Division, has a labeled $T_b=202°$ C. with $n_D{}^{25}=1.469$. A 2500 ml round bottom flask containing 1500 ml of NMP is heated to 150° C. and then a vacuum of about 29" (Hg) is applied to the system. The first 50 ml of the distillate is discarded. The collection of NMP distillate starts at 94° C./29" (Hg) and ends at $T_b$-101/30" (HG). The total distillate collected is about 1300 ml, with about 150 ml of yellowish residual NMP discarded. The freshly distilled NMP is then run through the LINDE Molecular Sieve, Type 4A PLTS, sold by Union Carbide Corporation, Materials System Division.

The N,N-dimethylformamide (DMF) as sold by Fisher Scientific Company, has a boiling point of 152.5–153.6±C. with a density of 0.944 at 25° C. The DMF is also similarly distilled under vacuum and then dehydrated by Molecular Sieve as described above.

EXAMPLE I

Procedure for Preparation of Polyimide Dianhydride

Into a 500 ml round bottom flask equipped with a Dean Stark trap is loaded 150 ml of a solvent (as indicated below) with 10 ml of toluene. The solution is quickly heated to 166° C. and distilled H₂O is collected in the Dean Stark trap. The distillation is continued until there is no more water obtained in the Dean Stark trap. The solution is cooled to about 60° C., then a solid powder mixture of 24.4 g of 2,4-toluenediamine (TDA) (0.2 moles) and 96.67 g of 3,3',4,4'-benzophenonetetracarboxylic dianhydride (BTDA) (0.3 mole) is added into the solution slowly in order to control the exotherm reaction and solution temperature. The solution is rigorously mixed at temperatures of about 60° C.±3° C. for 2 hours, then 0.2 g of 1,4-diazabicyclo-(2,2,2) octane (DABCO) is added and the solution is slowly heated to 160° C. When the solution temperature reaches about 130° C., the first drop of water appears in the Dean Stark trap. The degree of imidization at 145° C. is about 53%, at 153° C. about 84%, at 157° C. about 93%. After 2 hours above 157° C. to the maximum of 160° C., the imidization is completed. A total of 7.2 g of distilled H₂O is recovered. The total reaction time above 150° C. is about 4 hours. The polyimide is precipitated by adding 700 ml of acetone. The yield is 108 g or about 95%. The $r_m$ for this product is 0.667; the DP is 5; n is 2 and the C is 1.0. This polyimide is designated as: [BTDA-DTA]₂[AH]₂ which is soluble in both NMP and DMF. This procedure is used with phenol, m-cresol, dimethylformamide (DMF) and N-methyl-alpha-pyrrolidone (NMP) respectively.

The relative reactivities ($I_R$) of the respective polyimide dianhydrides are measured as the ratio of the Infrared Spectrum adsorption peak of the anhydride at 1840 cm$^{-1}$ to that of the imide at 1790 cm$^{-1}$. The reactivities are reported below in TABLE I.

TABLE I

| Polyimide Dianhydride | Solvent | $I_R$ |
| --- | --- | --- |
| A | NMP | 0.16 |
| B | DMF | 0 |
| C | Phenol | 0.33 |
| D | m-cresol | 0.36 |

EXAMPLE II

The polyimide dianhydrides A, B and C prepared in Example I are tested for reactivity with a Novolac epoxy resin, marketed by Ciba-Geigy, EPN 1138 which has an epoxy equivalent of 185-195. In each case, 25 g of EPN 1138 (0.1351 equivalent) is mixed with 70 g of the polyimide dianhydride A, B or C and 168 g of NMP to solutions of 36% and heated at the temperatures and for the periods indicated below in TABLE II. The ratio (R) of epoxy equivalents to anhydride equivalents in each case is 1.10. The respective viscosities are also reported in TABLE II.

TABLE II

| Polyimide Dianhydride | Solvent Used In Prep. | Temp. | Time | Resultant Viscosity Centipoises |
|---|---|---|---|---|
| A | NMP | 90° C. | 7 hrs. | 32 |
| B | DMF | 80° C. | 8 hrs. | 20 |
| C₁ | Phenol | 65° C. | 4 hrs. | 260 |
| C₂ | Phenol | 80° C. | 4 hrs. | 1,150 |

The respective viscosities relate to the respective anhydride activities as reported in Example I.

The above polyimide-epoxy resin solutions are applied individually onto 181E type glass cloth by hand, spreading and rolling it by using a roller over both faces of the glass cloth. The impregnated fabrics are dried in a well ventilated hood for at least 48 hours, then in a forced air oven at 65° C.-75° C. for about one hour and cut into strips of ½"×5". About 25 of the strips are loaded into a mold at temperatures of about 167° C. After the press is closed and pressure is applied at about 200 psi, the temperature of the mold is increased and held at 180° C. for 8 minutes. The die is then opened and the specimen is removed for testing. The tested results are listed below in Table IIa.

TABLE IIa

| | Properties of Polyimide Dianhydride-Epoxy Laminate | | |
|---|---|---|---|
| | Flexural Strength ($\times 10^{-3}$ psi) | Modulus ($\times 10^{-6}$ psi) | Resin Content |
| A | Delamination after opening of press | — | — |
| B | Delamination after opening of press | — | — |
| C₁ | 48.6 | 3.1 | 26.3 ± 2.5% |
| C₂ | 57.5 | 3.6 | 27.3 ± 2.2% |

A polyimide-epoxy product, using an oligo-imide dianhydride [BTDA-TDA]₅[AH]₂ prepared from NMP solution ($I_R=0.12$, C—1.0), laminated according to the above procedure as for the above preparation also delaminates upon molding.

EXAMPLE III

New Procedure for Preparation of Polyimide Dianhydride

A 200 ml round bottom flask is loaded with 86 ml of N-methyl-alpha-pyrrolidone (NMP), 16.1 gm (0.1 equivalent) of 3,4,3',4'-benzophenonetetracarboxylic dianhydride (BTDA), 6.5 gm (0.075 equivalent) of toluene diisocyanate* and 0.3 gm aluminum acetylacetonate. The anhydride/isocyanate ratio is 1.33/1. This mixture is heated at 70° C. for three hours and then under a stream of nitrogen at 140° C. for another three hours. The product has the formula:

O[(OC)₂C₆H₄C(O)C₆H₄(CO)₂N—Ar—N]₃(CO)-₂Ar'(CO)₂O and has an $I_R$ value of 0.26 as measured by infrared spectrum.

*—The toluene diisocyanate is a commercial product comprising 80% 2,4-toluene diisocyanate and 20% 2,6-toluene diisocyanate.

EXAMPLE IV

A polyimide dianhydride prepared as in Example III is added (70 gm) and is mixed with 25 g of EPN 1138 (0.1351 equivalent) and 170 gm of NMP to give a 36% solution and heated 80° C. for 5 hours. The laminates are prepared by hand spreading the above reaction product and then using a roller over both faces of the glass cloth. The impregnated fabrics are dried in a well ventilated hood for at least 48 hours, then in a forced air oven at 65° C.-75° C. for about one hour. About 25 of the strips are loaded into a mold at temperatures of about 167° C. After the press is closed and pressure is applied at about 200 psi, the temperature of the mold is increased to about 180° C. for about 8 minutes. The die is then opened and the specimen is removed for testing. The tested laminate has a flexural strength of 51.0 ($\times 10^3$) psi and a modulus of 3.1 ($\times 10^6$) psi.

EXAMPLE V

A polyimide diamine is prepared by repeating the procedure of Example III except that a Dean-Stark trap is used, an aromatic diamine is used instead of the diisocyanate and toluene is used to separate water from the reaction. The charge comprises 87 ml of NMP, 10 ml of toluene, 24.17 gm (0.15 equivalent) of BTDA, 12.2 gm (0.2 equivalent) of 2,4-toluenediamine, and 0.3 gm of Al acetylacetonate. The anhydride/amine ratio is 0.75/1. The Al acetylacetonate is used in this case to reduce or avoid decomposition byproducts in the subsequent molding. The mixture is heated first at 60° C. for 2 hours and then at 160° C. for 2 hours during which time 2.7 gms of water is collected. The product has a n value of 3 and has the formula:

H₂N—Ar—N(CO)₂Ar'(CO)₂]₃NArNH₂

EXAMPLE VI

The entire dianhydride product of Example II is well mixed with 27.75 gm (0.15 equivalent) of EPN 1138 and allowed to stand at room temperature for one hour. Then the polyimide diamine prepared in Example V is added and mixed before heating at 60° C. for 20 minutes to give a viscosity of 400 cps. This product is dried at room temperature for 48 hours and then used to laminate glass cloth E 180 (Clark-Schweibel fiberglass) as above. The laminates are compressed at 200 psi and heated at 160°-180° C. for 10 minutes. The laminated product has a flexural strength of 73.6×10³ psi and modulus of 5.0×10⁶ psi.

EXAMPLE VII

The procedure of Example III is repeated a number of times with similar high $I_R$ values as obtained in Example III using in place of the Al acetylacetonate equivalent amounts respectively of:

(a) Co acetylacetonate
(b) Fe acetylacetonate
(c) Ni acetylacetonate
(d) Zr acetylacetonate

EXAMPLE VIII

The procedure of Example III is repeated a number of times to give polyimide dianhydrides of similar $I_R$ values as obtained in Example III, using in place of the BTDA equivalent weights respectively of:

(a) Pyromellitic dianhydride
(b) 2,2',3,3'-diphenyl tetracarboxylic acid dianhydride
(c) 2,3,6,7-naphthalene tetracarboxylic acid dianhydride
(d) Bis-(3,4-dicarboxyphenyl)ether dianhydride

EXAMPLE IX

The procedure of Examples III, VII and VIII are repeated a number of times to give polyimide dianhydrides having similar $I_R$ product as obtained in Example III using in place of the toluene diisocyanate equivalent weights respectively of:

(a) 4,4'-diisocyanato-diphenylpropane
(b) 4,4'-diisocyanato-diphenylmethane
(c) 4,4'-diisocyanato-diphenyloxide
(d) 4,4'-diisocyanato-diphenylsulfide
(e) 1,3-diisocyanato-naphthalene
(f) 1,5-diisocyanato-naphthalene

EXAMPLE X

The procedure of Examples III, VII, VIII and IX are repeated with similar results in producing polyimide dianhydrides of high $I_R$ values using in place of the NMP solvent equal amounts respectively of dimethylacetamide and dimethylformamide.

The polyimide dianhydrides of Examples III, VII and X, when reacted with EPN 1138 polyepoxide are used satisfactorily to give laminated products in accordance with the procedure of Example II and particularly when a polyimide diamine is also added as in Example VI.

While certain features of this invention have been described in detail with respect to various embodiments thereof, it will of course be apparent that other modifications can be made within the spirit and scope of this invention and it is not intended to limit the invention to the exact details shown above except insofar as they are defined in the following claims.

The invention claimed is:

1. In the process of preparing a polyimide of the formula:

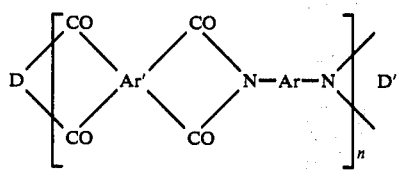

by the reaction of an aromatic dianhydride of the formula:

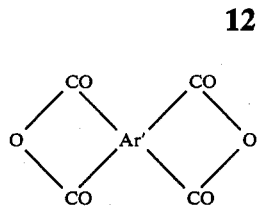

with an aromatic diisocyanate of the formula OC-N—Ar—CNO; wherein Ar' is a tetravalent aromatic organic radical, the four carbonyl groups being attached directly to separate carbon atoms and each pair of carbonyl groups being attached to adjacent carbon atoms in the Ar' radical except that in the case of the Ar' being a naphthalene radical one or both pairs of the carbonyl groups may be attached to peri carbon atoms; Ar is a divalent aromatic radical; n is an integer of at least one; D is a radical selected from the group consisting of O< and >N—AR—NCO; and D' is a radical selected from the group consisting of OC< and

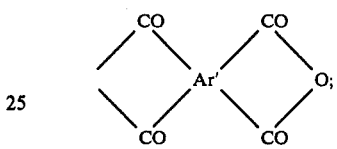

the improvement comprising the reaction of said aromatic dianhydride and said aromatic diisocyanate while in intimate contact with each other and with a metal acetylacetonate in which said metal is selected from the class consisting of Al, Co, Fe, Ni and Zr, the temperature of said reaction being in the range of 70°-150° C. and the amount of said metal acetylacetonate being in the range of 0.005-1 gram per equivalent weight of aromatic dianhydride.

2. The process of claim 1 in which a polyimide dianhydride is produced by using n+1 moles of said aromatic dianhydride and n moles of said aromatic diisocyanate.

3. The process of claim 2 in which a polyimide dianhydride is produced having an anhydride activity greater than 0.17 as measured by its infrared spectrum.

4. The process of claim 3 in which the amount of said metal acetyl acetonate is in the range of 0.01-0.05 gram per said equivalent weight.

5. The process of claim 3 in which said reaction is conducted at a temperature in the range of 100° C. to 140° C.

6. The process of claim 5 in which said metal acetylacetonate is Al acetylacetonate.

7. The process of claim 5 in which said metal acetylacetonate is Co acetylacetonate.

8. The process of claim 5 in which said metal acetylacetonate is Ni acetylacetonate.

9. The process of claim 5 in which said metal acetylacetonate is Fe acetylacetonate.

10. The process of claim 5 in which said metal acetylacetonate is Zr acetylacetonate.

11. The process of claim 3 in which said aromatic dianhydride is 3,4,3',4'-benzophenonetetracarboxylic dianhydride.

12. The process of claim 11 in which said aromatic diisocyanate is a toluene diisocyanate.

13. The process of claim 1 in which said aromatic diisocyanate is a toluene diisocyanate.

* * * * *

UNITED STATES PATENT AND TRADEMARK OFFICE
CERTIFICATE OF CORRECTION

PATENT NO. : 4,421,905
DATED : Dec. 20, 1983
INVENTOR(S) : Chung J. Lee

It is certified that error appears in the above-identified patent and that said Letters Patent is hereby corrected as shown below:

Col. 3, line 58, and col. 4, line 15, correct "n $CO_2$" to read "2n $CO_2$".

Col. 4, line 37, delete "one".

Col. 6, line 15, correct "ddisocyanato" to read "diisocyanato".

Col. 12, line 9, correct "OC-" to read "ON-".

Col. 12, line 10, correct "N" to read "C".

Signed and Sealed this

Twenty-sixth Day of February 1985

[SEAL]

Attest:

DONALD J. QUIGG

Attesting Officer  Acting Commissioner of Patents and Trademarks